United States Patent [19]

Kerz

[11] Patent Number: 4,476,086
[45] Date of Patent: Oct. 9, 1984

[54] COUPLER FOR NUCLEAR REACTOR ABSORBER RODS

[75] Inventor: Klaus Kerz, Bornschlade, Fed. Rep. of Germany

[73] Assignee: INTERATOM Internationale Atomreaktorbau GmbH, Bergish-Gladbach, Fed. Rep. of Germany

[21] Appl. No.: 374,237

[22] Filed: May 3, 1982

[30] Foreign Application Priority Data

May 14, 1981 [DE] Fed. Rep. of Germany ....... 3119297

[51] Int. Cl.³ .............................................. G21C 7/08
[52] U.S. Cl. .................... 376/219; 376/233; 294/86 R
[58] Field of Search .............. 376/233, 264, 268, 269, 376/270, 271, 219, 262, 229, 230, 235; 294/86 A, 86.17, 86.29, 86.3, 86.33, 94, 95, 97, 96, 106, 116, 88, 86 R

[56] References Cited

U.S. PATENT DOCUMENTS

| | | | |
|---|---|---|---|
| 3,694,021 | 9/1972 | Muller | 294/106 |
| 3,720,580 | 3/1973 | Schabert et al. | 376/233 X |
| 3,788,943 | 1/1974 | Miscuti et al. | 376/233 |
| 3,857,599 | 12/1974 | Jones et al. | 376/233 X |
| 3,937,513 | 2/1976 | Hoffmeister | 376/262 X |
| 3,938,845 | 2/1976 | Fehl et al. | 376/262 X |
| 3,959,071 | 5/1976 | Bevilacqua | 376/233 X |
| 4,199,184 | 4/1980 | Achelpohl | 294/106 |
| 4,286,380 | 9/1981 | Blount | 294/106 X |

FOREIGN PATENT DOCUMENTS

| | | | |
|---|---|---|---|
| 1226224 | 10/1966 | Fed. Rep. of Germany. | |
| 2040428 | 3/1971 | Fed. Rep. of Germany. | |
| 1950646 | 4/1971 | Fed. Rep. of Germany | 376/230 |
| 2436507 | 2/1976 | Fed. Rep. of Germany. | |
| 0910203 | 11/1962 | United Kingdom | 376/229 |

*Primary Examiner*—Richard E. Schafer
*Assistant Examiner*—Daniel Wasil
*Attorney, Agent, or Firm*—Herbert L. Lerner; Laurence A. Greenberg

[57] ABSTRACT

Coupler for absorber rods being suspended during operation of nuclear reactors including a plurality of actuating elements being movable for individually and jointly releasing the coupler, the movement of each of the actuating elements for releasing the coupler being independently controllable.

5 Claims, 12 Drawing Figures

COUPLER FOR NUCLEAR REACTOR ABSORBER RODS

The present invention relates to a coupler for absorber rods being suspended during operation of nuclear reactors. Shutdown devices of conventional nuclear reactors include a multiplicity of absorber rods which are suspended individually or jointly from releasable couplers. In normal operation, the absorber rods are inserted into the reactor core to a greater or lesser depth, hanging from their couplers, for instance, by means of a spindle drive. If the reactor must be shut down quickly, the couplers are disengaged and the absorber rods fall, accelerated by the force of gravity, into the reactor core. Claw couplers which engage in an undercut of the so-called gripping head of the absorber rod have been proposed as couplers for holding the absorber rod. The coupler can be actuated by the release of the armature of an electromagnet which becomes de-energized in the case of a shutdown. A shutdown device of the type described above is known from German published non-prosecuted application DE-OS No. 20 40 428.

In the known devices, each absorber rod coupler is released by only one mechanism. If the mechanism fails due to a disturbance, the absorber rod suspended therefrom is no longer available for shutting down the reactor, which forces the provision of a number of rods exceeding the minimum requirement i.e. a redundant number thereof, so that even in the case of the malfunctioning of a number of couplers, the shutdown of the reactor is reliably achieved. This, however, results in very great additional costs.

It is accordingly an object of the present invention to provide a coupler for nuclear reactor absorber rods which overcomes the hereinafore-mentioned disadvantages of the heretofore-known devices of this general type, and which can be released by several redundant mechanisms.

With the foregoing and other objects in view, there is provided, in accordance with the invention a coupler for absorber rods being suspended during operation of nuclear reactors, including a plurality of actuating elements being movable for individually and jointly releasing the coupler, the movement of each of the actuating elements for releasing the coupler being independently controllable. The coupler is released if only one of the actuating elements operates as required, it being assumed that upon release of the fast shutdown, each actuating element is independent of each other.

In accordance with another feature of the invention, the movement for each of the actuating elements for releasing the coupler is different. This is to ensure that several actuation elements do not fail simultaneously because of a fault common to all of them.

The following specific embodiments of the invention are suitable for cooperation with absorber rods for nuclear reactors of conventional construction that have a mushroom-like gripper head at their upper end which can be gripped from the outside by claws or which is provided at its outer rim with a circular inward-directed shoulder with which claws that can be swung from the inside to the outside can engage. In accordance with a further feature of the invention, the actuating elements include coupler claws for engaging undercuts formed below gripper heads of absorber rods and which include a locking device for holding the coupler claws in a common position engaging the undercuts, the locking device being movable transversely to the longitudinal axis of the coupler. The locking device just proposed above has the effect that the coupling claws are mutually held in the holding position in a certain position relative to each other but that the coupler is released as soon as only one of the claws changes it position.

In accordance with an additional feature of the invention, at least one of the coupler claws are swingable out of the undercut formed below the gripper head of the absorber rod and are shiftable downward.

In accordance with an added feature of the invention, at least one of the coupler claws are swingable out of the undercut formed below the gripper head of the absorber rod and are axially rotatable.

In accordance with yet another feature of the invention, at least one of the coupler claws are swingable out of the undercut formed below the gripper head of the absorber rod and are axially fixed and include an axially movable locking member engageable between the at least one coupler claw and the locking device. These features indicate one possible embodiment each of the coupler claws. The coupler according to the invention can be equipped with claws of only one of the types described; however, all three types can be used in a single coupler as will be described further on.

Other features which are considered as characteristic for the invention are set forth in the appended claims.

Figure 1:
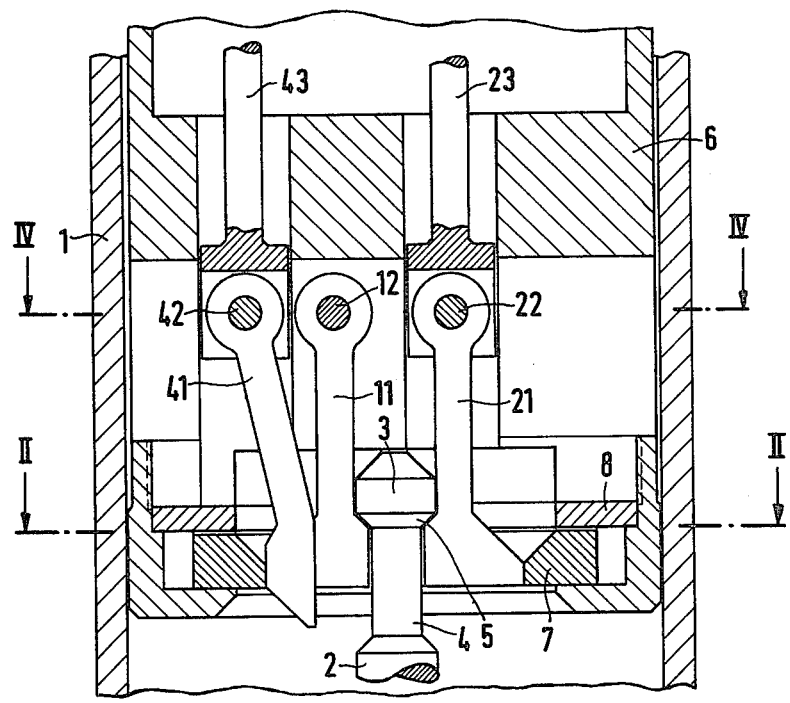
FIG. 1 is a fragmentary, diagrammatic, axial longitudinal sectional view of the coupler of the invention in the closed position, taken along the line I—I in FIG. 2, in the direction of the arrows.
Figure 2:
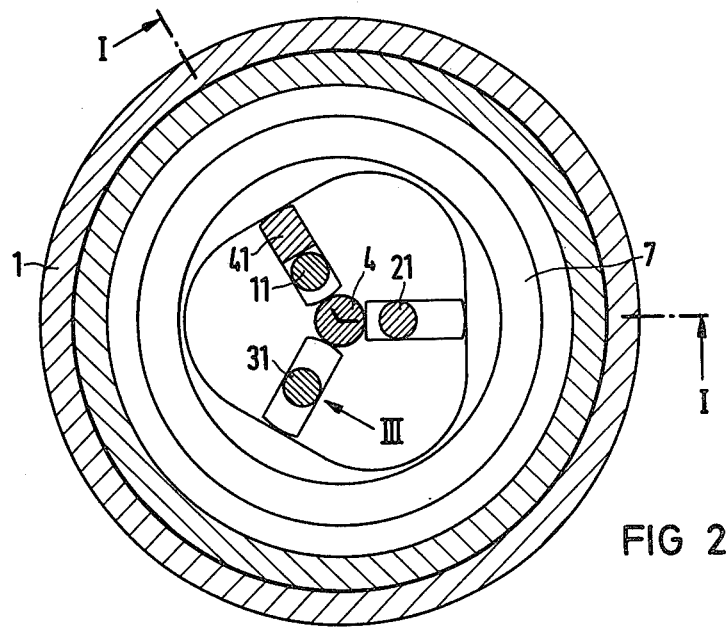
FIG. 2 is a cross-sectional view taken along the line II—II of FIG. 1, in the direction of the arrows.
Figure 3:
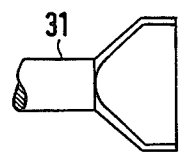
FIG. 3 is a side-elevational view of an individual part as seen from the direction of the arrow III of FIG. 2.
Figure 4:
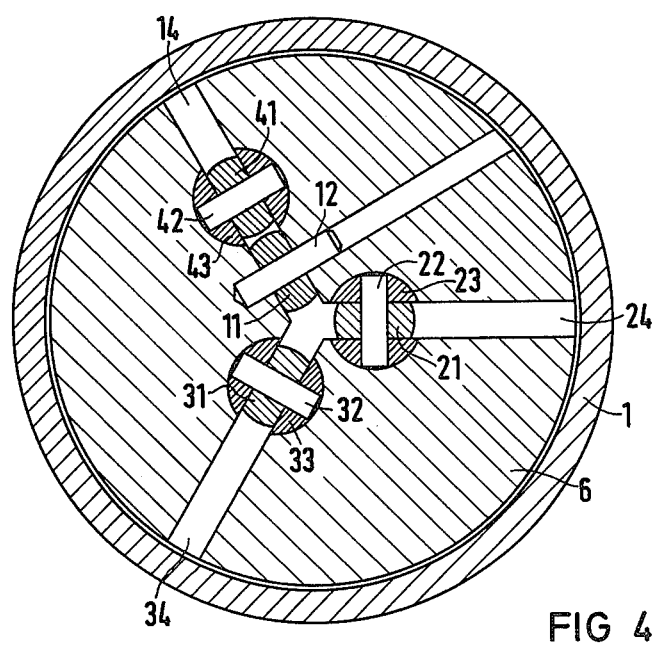
FIG. 4 is a view similar to FIG. 2 taken along the line IV—IV of FIG. 1, in the direction of the arrows.

Referring now to the figures of the drawing as a whole, there is seen an absorber rod 2 which is suspended in a guide tube 1, that can be accelerated under the influence of gravity, optionally with the aid of non-illustrated springs, into likewise non-illustrated core assembly of a reactor, in order to shut the reactor down. The absorber rod 2 is provided with a gripper head 3 which has areas 5 that are inclined toward the horizontal at the transition to an undercut 4. With these areas 5, the gripper head 3 is supported on a first claw 11, a second claw 21 and a third claw 31. The claws are provided with projections in part on one side (first claw 11) and in part on two sides (second claw 21 and third claw 31 are seen in FIG. 3). The first claw 11 is pivoted about a first pivot axis 12 which is firmly attached to a coupling housing 6. The second claw 21 can pivot about a second pivot axis 22 and can be moved downward at the same time in the axial direction by a linkage 23. The third claw 31 is pivotable about a third pivot axis 32 (shown in FIG. 4), and can be rotated by means of a further linkage 33 about an axis disposed parallel to the longitudinal axis of the device. Further provided is a locking member 41 which is pivotable about a fourth pivot axis 42 and can be moved upward in the longitudinal dlrection by means of a further linkage 43. The claws 11, 21 and 31 and the locking device 41 are surrounded by a locking device in the form of a ring 7 which is freely movable in a space in direction transverse to the longitudinal axis of the device. Said space is formed by the bottom of the housing 6 and a stop 8 that is likewise ring-shaped and is firmly connected to the housing 6. The lateral swinging-out movement of the claws 11, 21 and 31 and of the locking device 41 is made possible by the radial slots 14, 24, 34 which are formed in the housing 6 and seen in FIG. 4. The axial movement of the linkages 23, 33, 43 can be caused by any mechanism, not illustrated in the drawings; the use of shutdown devices for nuclear reactors which are known in numerous constructions, are based on the release of an armature (with optional spring assistance) from an electromagnet which has become de-energized by the shutdown command.

Figure 5:
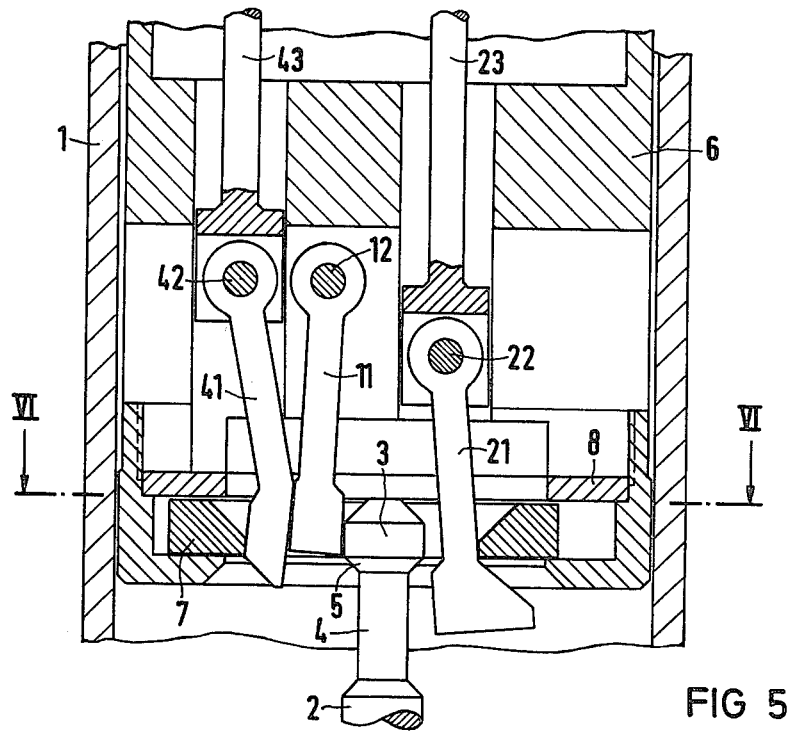
FIG. 5 is a view similar to FIG. 1 showing a first open state of the coupler according to FIG. 1, taken along the line V—V of FIG. 6, in the direction of the arrows.
Figure 6:
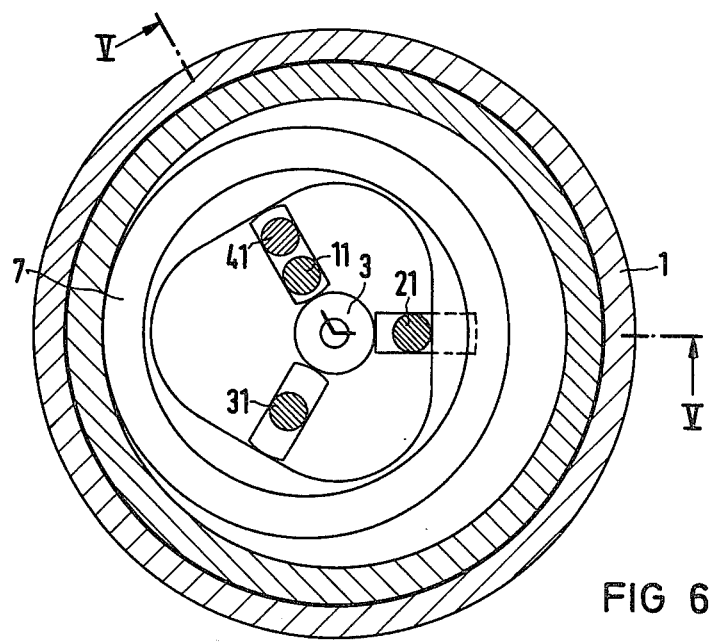
FIG. 6 is another view similar to FIG. 2 taken along the line VI—VI of FIG. 5, in the direction of the arrows.
Figure 7:
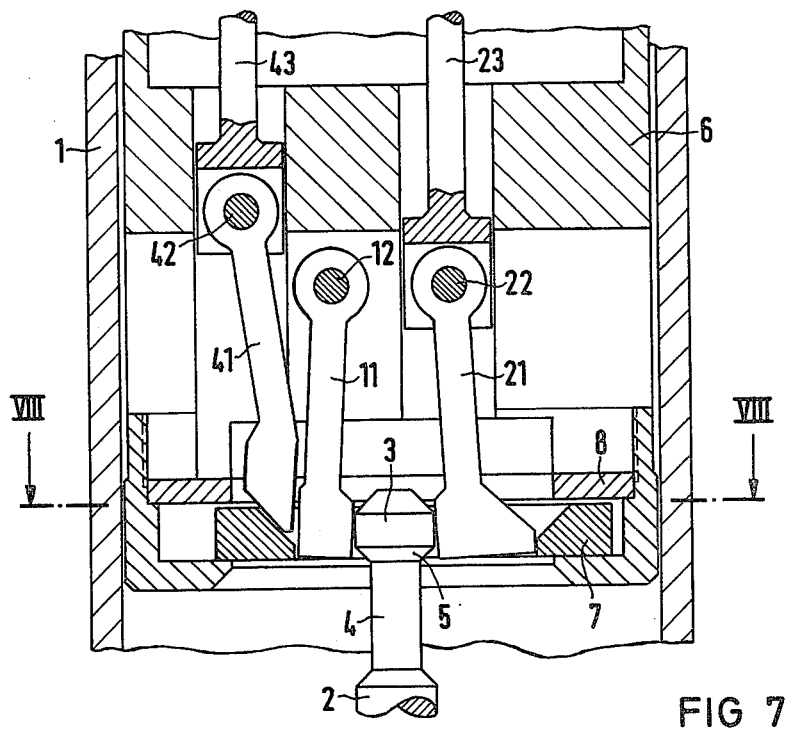
FIG. 7 is a further view similar to FIG. 1 showing a second open state of the coupler according to FIG. 1, taken along the line VII—VII of FIG. 8, in the direction of the arrows.
Figure 8:
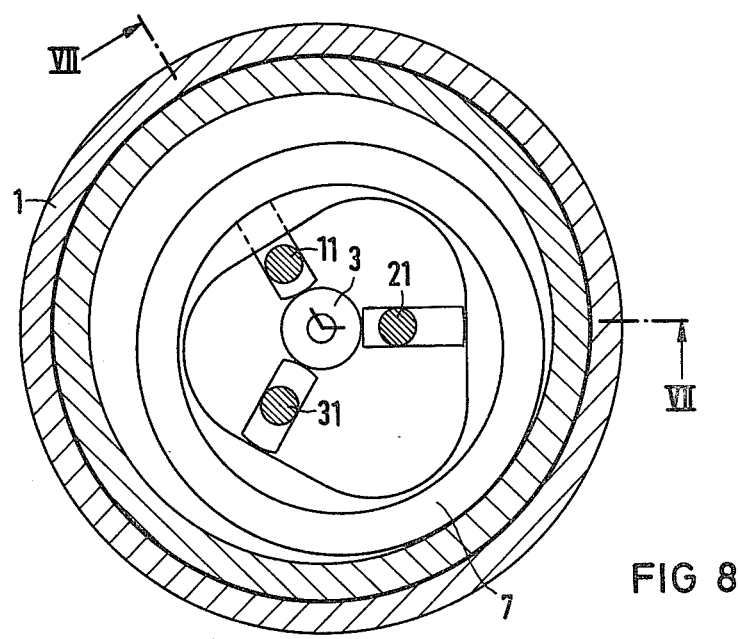
FIG. 8 is a further view similar to FIG. 2, taken along the line VIII—VIII of FIG. 7, in the direction of the arrows.
Figure 9:
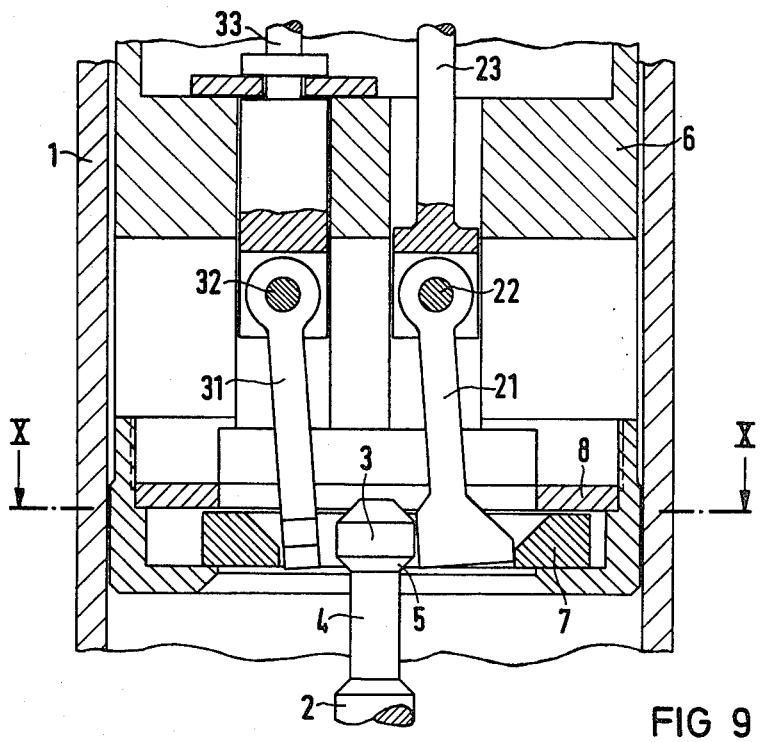
FIG. 9 is an additional view similar to FIG. 1, showing a third open state of the coupler according to FIG. 1, taken along the line IX—IX of FIG. 10, in the direction of the arrows.
Figure 10:
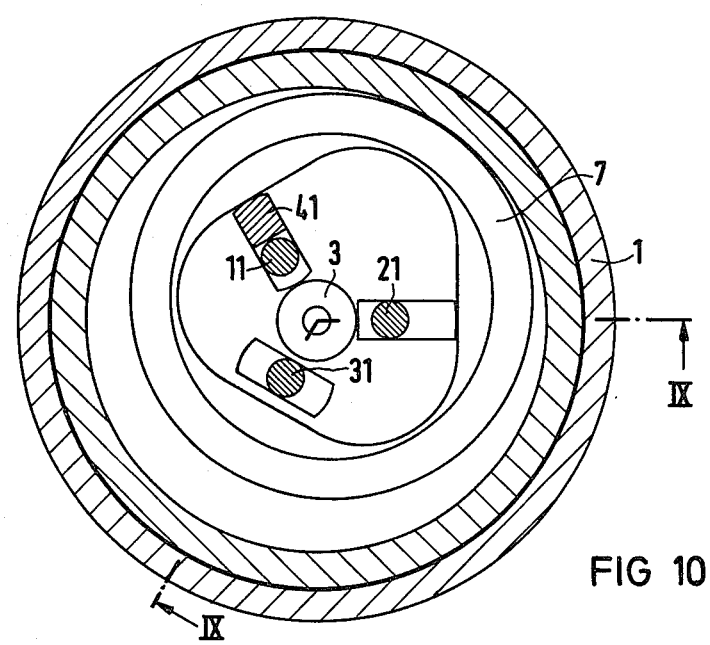
FIG. 10 is an additional view similar to FIG. 2, taken along the line X—X of FIG. 9, in the direction of the arrows.

In this manner, the second claw 21 may have been moved downward by means of its linkage 23 in accordance with the position shown in FIGS. 5 and 6. Under the influence of gravity, the absorber rod 2 introduces a laterally-acting force into the first claw 11 through the inclined surface 5. The first claw 11, together with the adjacent locking device 41, gives way to the extent that the gripper head 3 falls away from the first claw 11 (and in a similar non-illustrated manner, also falls away from the third claw 31). This is made possible by the fact that the ring 7 can likewise move further, responding to this force, (to the left in the drawing), because the second claw 21 is permitted mobility for this purpose in its new position. An alternative form of releasing the coupler is shown in FIG. 7 and 8. In this position, the locking member 41 has been pulled upward by means of its linkage 43 so that the space occupied heretofore by the locking member 41 within the ring 7 has been vacated. In this case, the weight of the absorber rod 2 also assures that the claws are urged to one side laterally, moving the ring 7 (toward the right in the drawing) so far that the gripper head 3 can slide off the claws. Another different possible embodiment of the coupler is shown in FIGS. 9 and 10 in which the third claw 31 has been rotated about its own longitudinal axis by means of its linkage 33. In this way, a lateral shift is also made possible for the ring 7 which permits the first claw 11, the locking device 41 and the second claw 21 to give way. In what has been said above, it has been assumed that each of the claws 11, 21, 31 is released by a different type of actuation. The coupler according to the invention, however, can also be constructed in such a way that all of the claws are provided in only one of the constructions described, and specifically are released by movements of the actuating elements which, while independent, are in the same direction.

Figure 11:
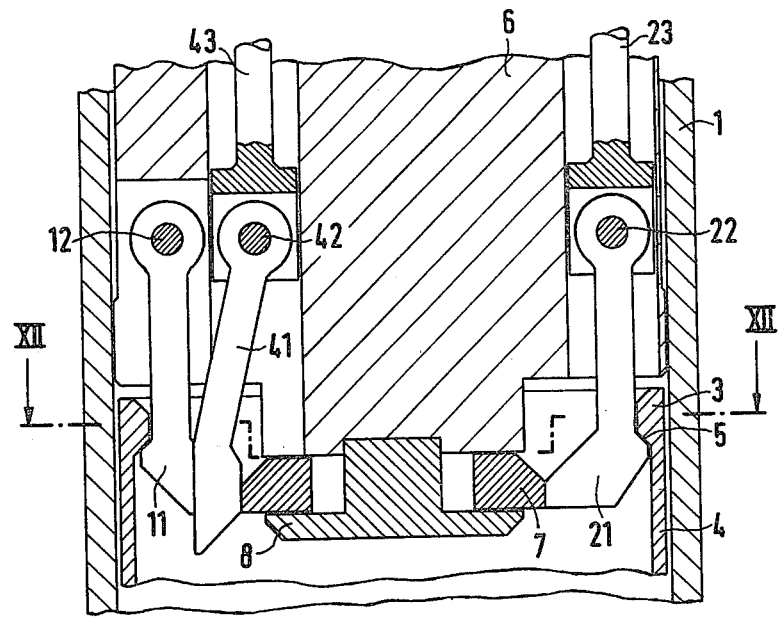
FIG. 11 is a view which is similar to FIG. 1, which is a longitudinal axial-sectional view through an embodiment of the coupling as an alternative to FIG. 1, in the closed position, taken along the line XI—XI of FIG. 12, in the direction of the arrows.
Figure 12:
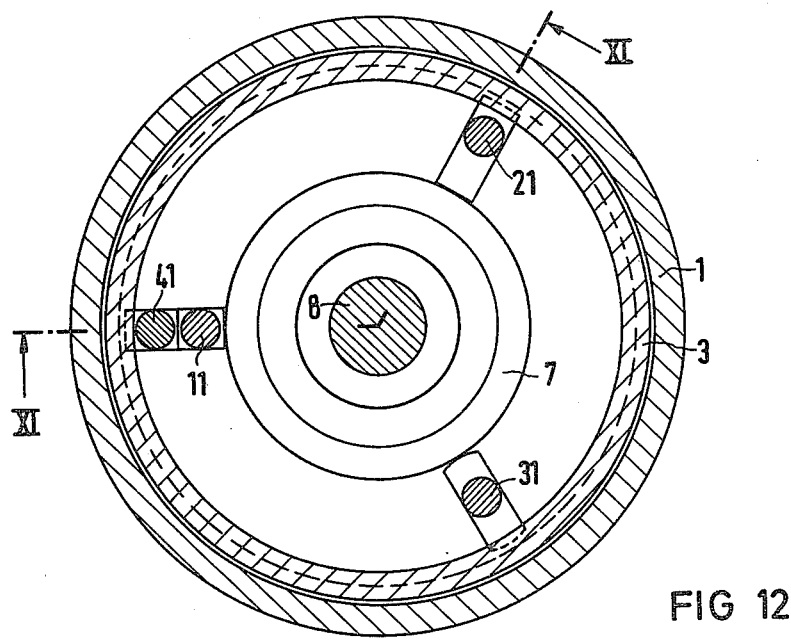
FIG. 12 is a cross-sectional view similar to FIG. 2, taken along the line XII—XII of FIG. 11, in the direction of the arrows.

FIGS. 11 and 12, finally, show an alternative construction for such absorber rods which have a holding edge extending about the rim of a hollow cylinder, instead of a mushroom-shaped gripper head 3. Since the function of the parts are unchanged from the ones shown in the previous figures, they are also provided with the same reference symbols. The coupler can be released by means of the same movements of the claws 11, 21, 31 or the locking member 41, respectively, even if the ring 7 is disposed on the inside of these elements.

There are claimed:

1. In a nuclear reactor having absorber rods with gripper heads and undercuts formed immediately below the gripper heads, the absorber rods being suspended during operation of the nuclear reactor, the improvenment comprising a coupler for the absorber rods, including a plurality of actuating elements being moveable for individually and jointly releasing the coupler, said actuating element including coupler claws for engaging the undercuts, and a locking device for holding said coupler claws for simulataneously engaging the undercuts, said locking device being movable transversely to the longitudinal.axis of the coupler, and said movement of each of said actuating elements for releasing the coupler being independently controllable.

2. Coupler according to claim 1, wherein said movement for each of said actuating elements for releasing the coupler is effected in a different direction.

3. Coupler according to claim 1, wherein at least one of said coupler claws are swingable out of the undercut formed below the gripper head of the absorber rod and are shiftable downward.

4. Coupler according to claim 1, wherein at least one of said coupler claws are swingable out of the undercut formed below the gripper head of the absorber rod and are axially rotatable.

5. Coupler according to claim 1, wherein at least one of said coupler claws are swingable out of the undercut formed below the gripper head of the absorber rod and are axially fixed, and including an axially movable locking member engageable between said at least one coupler claw and said locking device.

* * * * *